United States Patent [19]

Kawasaki

[11] Patent Number: 4,697,842
[45] Date of Patent: Oct. 6, 1987

[54] FRONT COVER FOR SMALL-SIZED VEHICLES

[75] Inventor: Katsuyoshi Kawasaki, Tokyo, Japan

[73] Assignee: Honda Giken Kogyo Kabushiki Kaisha, Tokyo, Japan

[21] Appl. No.: 879,545

[22] Filed: Jun. 24, 1986

Related U.S. Application Data

[63] Continuation of Ser. No. 410,924, Aug. 24, 1982, abandoned.

[30] Foreign Application Priority Data

| Aug. 28, 1981 | [JP] | Japan | 56-135962 |
| Aug. 28, 1981 | [JP] | Japan | 56-135960 |
| Aug. 28, 1981 | [JP] | Japan | 56-128276[U] |
| Sep. 11, 1981 | [JP] | Japan | 56-135078[U] |
| Apr. 20, 1982 | [JP] | Japan | 57-065722 |
| Apr. 20, 1982 | [JP] | Japan | 57-065723 |

[51] Int. Cl.$^4$ .................... B62J 17/02; B62J 7/06; B60R 5/02
[52] U.S. Cl. .................... 296/78.1; 296/37.1; 296/37.12; 293/117; 293/121; 70/451; 70/124; 16/250; 280/289 A
[58] Field of Search .............. 296/78.1, 76; 280/202, 280/289 R, 289 A, 289 S, 289 C, 289 G; 180/210, 215, 219; D12/85, 107, 184–186, 182

[56] References Cited

U.S. PATENT DOCUMENTS

| D249,257 | 9/1978 | Beaubien et al. | D12/182 |
| 1,408,387 | 2/1922 | Nichols et al. | 16/251 |
| 2,274,160 | 2/1942 | Porter | 16/251 |
| 2,401,245 | 5/1946 | Hobbs | 296/78.1 |
| 2,559,736 | 7/1951 | Scarborough | 292/DIG. 72 |
| 2,860,911 | 11/1958 | Cotter | 296/146 |
| 2,877,760 | 3/1959 | Swerman | 292/DIG. 72 |
| 3,016,968 | 5/1985 | Lenz et al. | 296/76 |
| 3,075,234 | 1/1963 | Speakman | 16/250 |
| 3,525,687 | 8/1970 | Ross et al. | 296/76 |
| 3,943,351 | 3/1976 | Nilsson | 362/80 |
| 4,099,397 | 7/1978 | Dauenbaugh | 70/451 |
| 4,320,906 | 3/1982 | Saunders, IV | 296/78.1 |
| 4,325,105 | 4/1982 | Scimonelli | 362/80 |
| 4,356,876 | 11/1982 | Watanabe et al. | 180/210 |
| 4,366,530 | 12/1982 | Milhous | 362/80 |
| 4,372,602 | 2/1983 | Tsuchiya | 296/78.1 |
| 4,461,508 | 7/1984 | Ogishima | 296/78.1 |

FOREIGN PATENT DOCUMENTS

| 546565 | 4/1956 | Belgium | 280/289 G |
| 2711339 | 9/1978 | Fed. Rep. of Germany | 293/102 |
| 480409 | 4/1953 | Italy | 296/78.1 |
| 529623 | 6/1955 | Italy | 296/78.1 |
| 580509 | 4/1957 | Italy | 296/78.1 |
| 644336 | 9/1962 | Italy | 340/134 |
| 1537233 | 12/1978 | United Kingdom | 296/78.1 |

Primary Examiner—Dennis H. Pedder
Attorney, Agent, or Firm—Irving M. Weiner; Joseph P. Carrier; Pamela S. Burt

[57] ABSTRACT

A front cover device for small-sized vehicles having a steering support which supports a front wheel steering mechanism. The front cover device comprises a leg shield member which surrounds the steering support portion and which covers the front and lateral sides of the steering support, and a goods accommodating space which is formed within the leg shield member and around substantially the entire circumference of the steering support. The front cover device is relatively solid and light with substantial design freedom for providing a favorable appearance while providing a relatively large goods accommodating space. The leg shield member includes a lid member which is pivotally secured at the lower end thereof to a front portion of the leg shield member through at least one hinge mechanism. Also, the vehicle includes at least one bumper comprising an elastic member which is mounted so as to cover the hinge mechanism, whereby the bumper comprises a forwardmost projection of the front cover device.

10 Claims, 18 Drawing Figures

FRONT COVER FOR SMALL-SIZED VEHICLES

This is a continuation of application Ser. No. 410,924, filed Aug. 24, 1982, abandoned.

BACKGROUND OF THE INVENTION

1. Field of the Invention

The present invention relates generally to a front cover device for small-sized vehicles. More particularly, the invention relates to a front cover device disposed around a steering mechanism in small-sized vehicles such as motorcycles and three-wheeled motor vehicles, as well as four-wheeled motor vehicles which are similar thereto.

2. Description of Relevant Art

In small-sized vehicles such as motorcycles and three-wheeled motor vehicles, as well as four-wheeled motor vehicles similar thereto, there is known a front cover which is disposed around a steering support portion supporting a front wheel steering mechanism.

The front cover device in such small-sized vehicles is normally required to perform a leg shielding function, and thus is desired to be as solid as possible. On the other hand, such small-sized vehicles are basically required to be as light as possible and at the same time to have a favorable appearance and to perform other functions from the standpoint of commercial value.

Further, in the aforesaid small-sized vehicles, and particularly in low-floored type small-sized motor vehicles which are in wide popular use, it is important to ensure as large a goods accommodating space as possible without detrimentally affecting the appearance of the vehicle.

The present invention effectively overcomes the above-mentioned problems encountered in conventional small-sized vehicles.

SUMMARY OF THE INVENTION

In a small-sized vehicle having at least one front wheel, a steering mechanism for steering the front wheel, and a steering support which supports the steering mechanism, the present invention provides a front cover device comprising a leg shield member which covers the front and lateral sides of the steering support, and a goods accommodating space which is enclosed by the leg shield member. The goods accommodating space is disposed on the front side of the steering support and is openable from the front.

It is an object of the present invention to provide a front cover device in a small-sized vehicle having a steering support portion whch supports a front wheel steering mechanism, the front cover device being relatively solid and light and capable of maintaining a high degree of design freedom in providing an aesthetically pleasing appearance while ensuring a relatively large goods accommodating space.

It is another object of the present invention to provide, in a small-sized vehicle of the type described hereinabove, a front cover device provided with a goods accommodating space capable of being easily utilized.

A further object of the present invention is to provide, in a small-sized vehicle of the type described hereinabove, a front cover device having an all-weather type goods accommodating space.

It is another object of the present invention to provide, in a small-sized vehicle of the type described hereinabove, a front cover device which when contacted with an obstacle serves to cushion the reaction force in a desirable manner.

A still further object of the present invention is to provide, in a small-sized vehicle of the type described hereinabove, a front cover device having a construction which takes into consideration the shape and mounting position of a lighting unit, while embodying a design concept which provides a more aesthetically pleasing appearance.

The above and further objects, details and advantages of the present invention will become apparent from the following detailed description, when read in conjunction with the accompanying drawings.

DETAILED DESCRIPTION OF PREFERRED EMBODIMENTS

Figure 1:
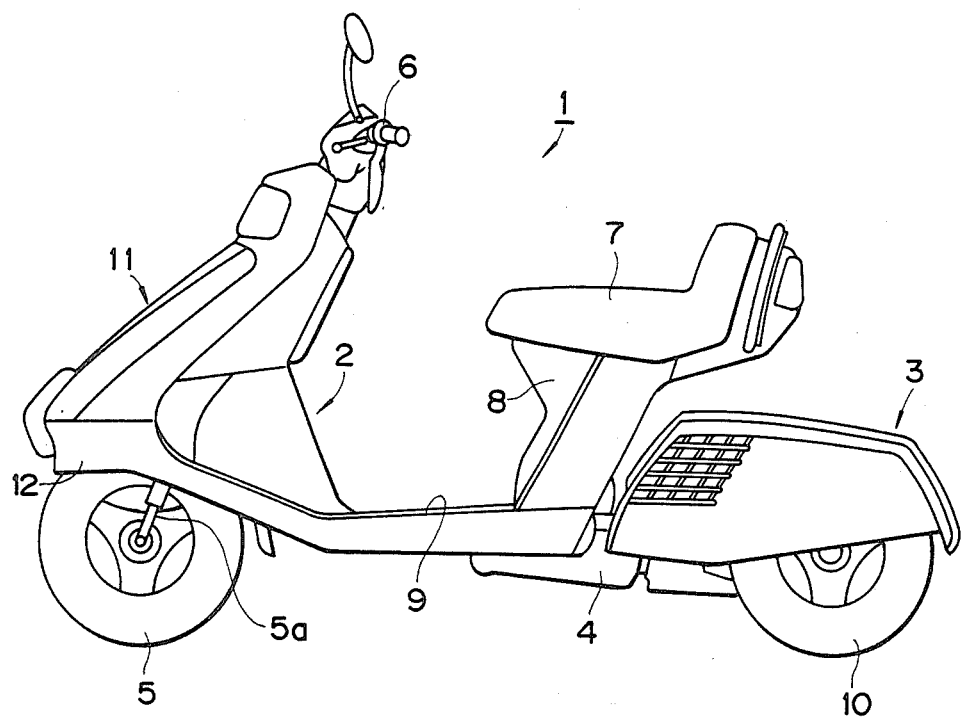
FIG. 1 is an overall side view of a small-sized vehicle provided with a front cover device in accordance with the present invention.
Figure 2:
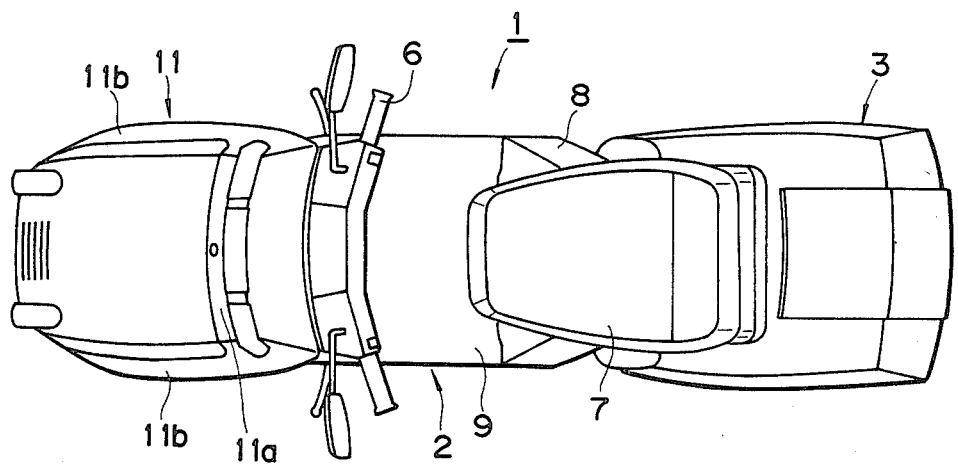
FIG. 2 is a plan view of the vehicle of FIG. 1.
Figure 3:
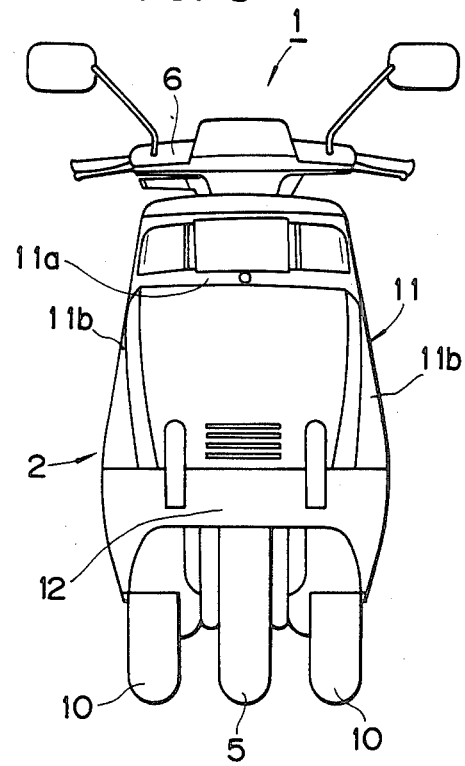
FIG. 3 is a front view of the vehicle of FIG. 1.

With reference to FIGS. 1 through 8, reference numeral 1 in FIGS. 1 through 3 generally designates a three-wheeled motor vehicle. The three-wheeled motor vehicle 1 comprises a front vehicle body 2 and a rear vehicle body 3 which are interconnected for relative swinging and rolling motion through a joint 4. At the front portion of the front vehicle body 2 there is mounted a leg shield 11 which extends upwardly as a constituent member of a front cover. The leg shield 11 is mounted so as to cover the front and sides of a head pipe 2b (FIG. 6), as will be described in detail hereinbelow. The pipe 2b serves as a steering support member for supporting a steering mechanism comprising a single front wheel 5 as a steering wheel, a front fork 5a which is pivotably inserted through the head pipe 2b, and a handlebar 6. From the rear portion of the front vehicle body 2 there extends upwardly a seat post having a seat 7 mounted at the top thereof, and an intermediate portion between the front and rear portions of the front vehicle body 2 forms a low floor 9. The rear vehicle body 3 is provided with two rear wheels 10 as driving wheels.

Figure 4:
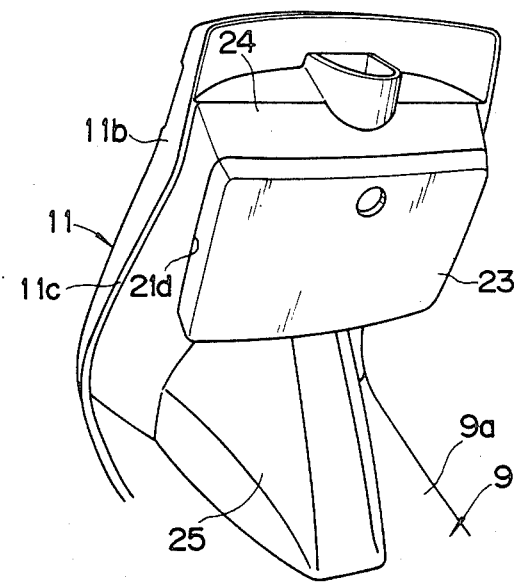
FIG. 4 is an enlarged perspective rear view of the front cover device shown in FIG. 1.

As shown in FIGS. 2 and 3, the leg shield 11 is formed to be somewhat wider than the bodily width of a driver having an average physical constitution, i.e., the leg shield 11 is wider than seat 7, and a front portion 11a thereof is inclined rearwardly. An integrally formed front fender 12 extends from the lower portion of the front portion 11a to both sides 11b so as to cover the upper portion of the front wheel 5. As shown in FIG. 4, a rear portion 11c of leg shield 11 is connected to the floor 9. Mounted transversely above the front portion 11a, as shown in FIG. 5, is a container portion 13 which opens to the front to define a space for accommodating a lighting unit including a headlight and blinker lights.

From the front portion 11a to the sides 11b of the leg shield 11 and in the area from below the container portion 13 up to the front fender 12 there is formed a large recessed front goods accommodating compartment 14 which opens to the front. The front compartment 14 includes an inner wall 14a, and a bracket 15 is fixed to the back of the inner wall 14a centrally in a transverse direction, the bracket 15 also being secured to the head pipe 2b which is fixed to the front end of a frame 2a of the front vehicle body 2, whereby the leg shield 11 is secured to be supported by the head pipe 2b which serves as a steering support member.

Figure 5:
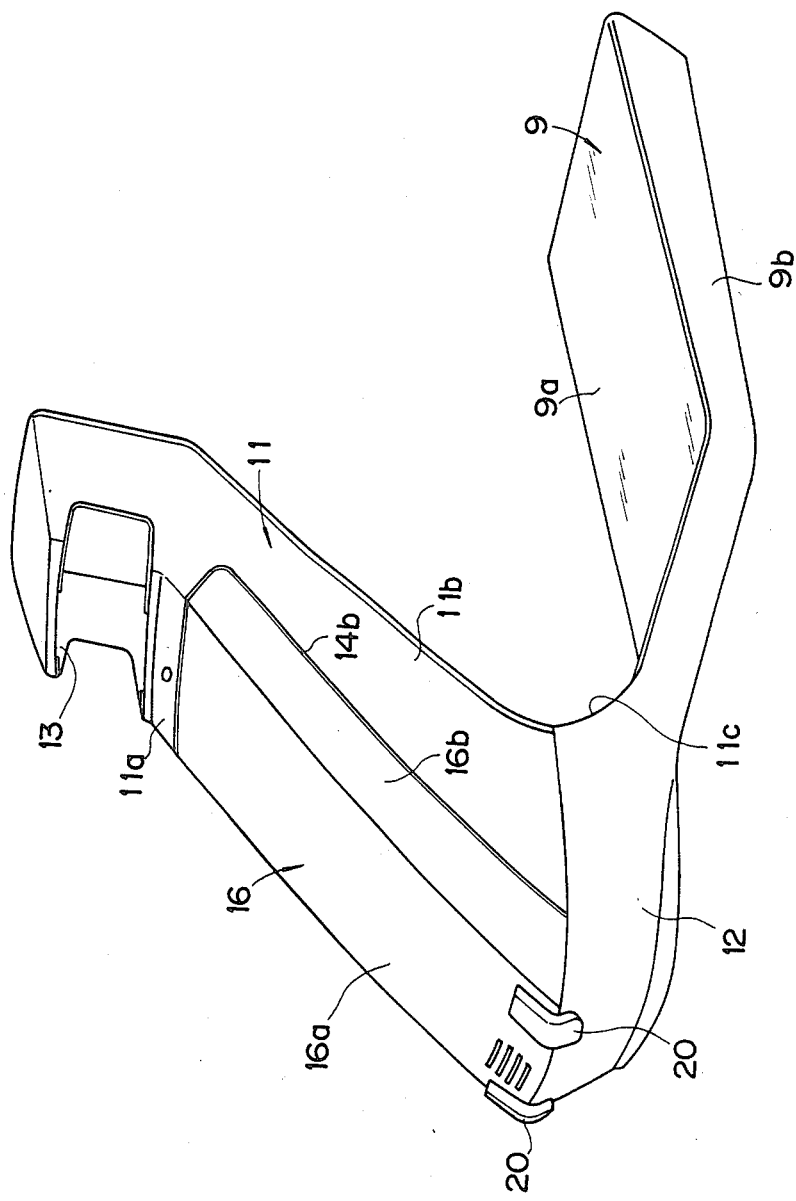
FIG. 5 is a perspective front view of the front cover device of FIG. 4.
Figure 6:
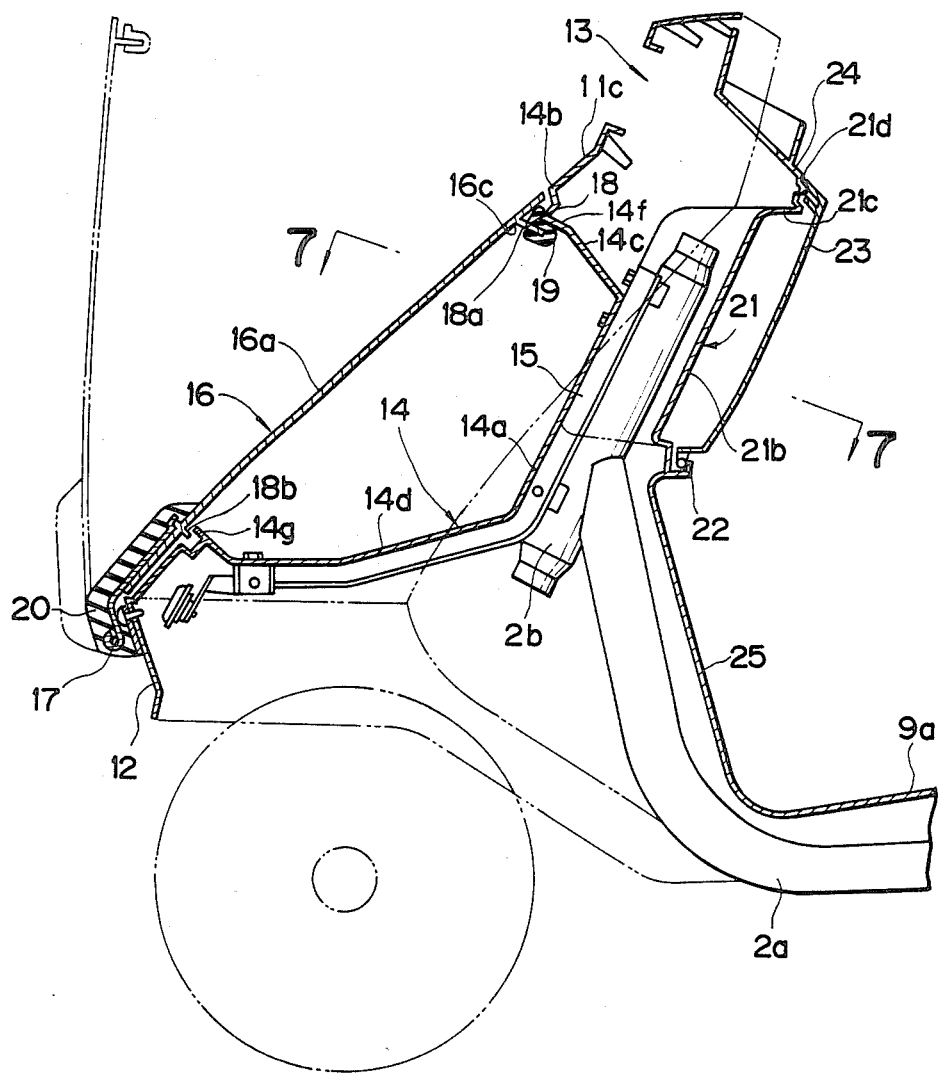
FIG. 6 is a longitudinal sectional view of a principal portion of the front cover device of FIG. 4.
Figure 7:
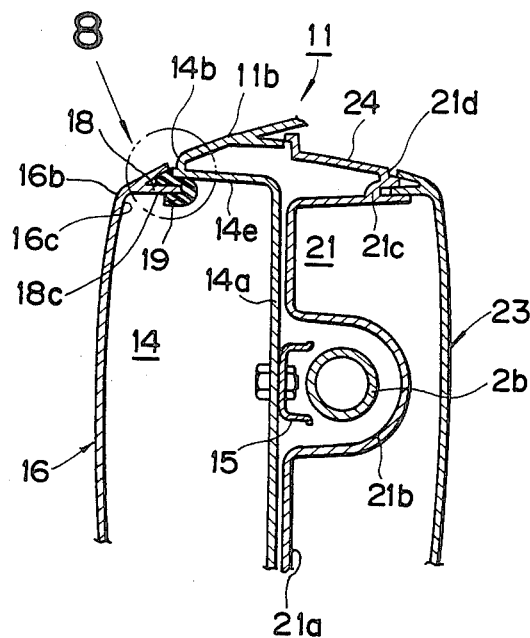
FIG. 7 is a sectional view of a principal portion taken along line 7—7 of FIG. 6.

To the front compartment 14, as shown in FIGS. 5 through 7, is attached a lid member 16 which has an external configuration mating with an opening edge 14b of the front compartment 14 and which normally closes the latter. The lid member 16 is pivoted for opening and closing motion to the front fender 12 through right and left hinges 17 at the lower end of a front portion 16a thereof, and has right and left sides 16b which are bent in corresponding relation to the opening edge 14b of the front compartment 14 i.e., so as to extend to the right and left sides, respectively of leg shield 11. On the peripheral edge of the inner surface 16c of lid member 16 there is formed a projection 18 with a flexible rubber seal 19 being fitted over the projection 18 to tightly seal the opening edge 14b of the compartment 14 when the lid 16 is closed. The lid member 16 has a substantially large flat surface of substantial length and width so that it may serve as a reflector board for lighting up the inside of the front compartment 14. The limit of the opening angle of the hinges 17 is set such that the lid member 16 remains in a substantially vertically erect position when open, as shown in FIG. 6. As also shown, the upper end of the lid member 16 is positioned above the lower end of a headlight to be received in the container portion 13 when the lid member 16 is in such vertically erect position. The outer surfaces of the hinges 17 are each covered with a rubber member 20 which serves as a bumper, and thus the bumpers 20 are provided at both right and left front portions of the fender 12. In the illustrated embodiment, the front compartment 14 and the leg shield 11 are integrally molded to enhance the strength of the leg shield 11, but alternatively may be formed separately provided the compartment is disposed within the leg shield.

Behind the front compartment 14, as shown in FIGS. 4, 6 and 7, there is provided a rear goods accommodating compartment 21 which surrounds, from behind and either side, the head tube 2b as the steering support member. Thus, the goods accommodating compartments 14 and 21 are provided around the circumference of the steering support portion 2b.

The rear compartment 21 is formed integrally with the leg shield 11 so that it is rearwardly adjacent the inner wall 14a of the front compartment 14, and is open to the rear, i.e., to the driver's side. An inner wall 21a of the rear compartment 21 is positioned at the rear of the inner wall 14a of the front compartment 14, and centrally in the transverse direction thereof is formed a rearwardly recessed, semi-cylindrical portion 21b which surrounds, from behind, the head tube 2b.

The rear compartment 21 is formed so as to have a relatively large width and extends up to the upper portion of the rear surface 11c of the leg shield 11, while being surrounded by a circumferential wall portion 21c which projects from the inner wall 21a to the driver's side. A lid member 23 is pivoted for opening and closing motion to the compartment 21 through hinges 22 provided at the lower end of an opening edge 21d of the compartment 21. The lid member 23 is substantially in the form of a square and is arranged in facing relation to the driver, as shown.

Adjacent the opening edge 21d of the circumferential wall 21c of the rear compartment 21 and above and on both sides thereof is formed a forwardly bent outer wall portion 24. The outer wall portion 24 is jointed to the sides 11b of the leg shield 11 and is also constructed integrally with a rising portion 25 which is formed from below the opening edge 21d so as to surround the frame 2a, and is thereby connected, as a rear cover member for the leg shield 11, to an upper surface 9a of the floor 9. The sides 11b of the leg shield 11, as shown in FIG. 5, are connected to sides 9b of the floor 9 through the front fender 12.

As described hereinabove, the goods accommodating compartments 14 and 21 are provided around the circumference of the steering support member 2b by effectively utilizing the space therearound, while ensuring a favorable appearance.

Further, although the goods accommodating compartments 14 and 21 are provided around the circumference of the steering support portion 2b, the front compartment 14 is disposed above the fender 12 and the rear compartment 21 is disposed still thereabove, and therefore the low floor 9 can be substantially elongated in the longitudinal direction thereof without having to widen the front portion thereof.

In the foregoing construction, the projection 18 formed along substantially the overall circumference of the inner surface 16c of the lid 16 is covered at the upper portion 18a and side portion 18c thereof with the rubber seal 19, as shown in FIGS. 6 and 7, thereby closing and sealing a stepped portion comprising an upper side portion 14f of the opening edge 14b, while the lowest portion 18b thereof is loosely fitted in a recess of a lower side portion 14g of the opening edge 14b. Thus, the compartment 14 is substantially rearwardly concave as surrounded by right and left inside walls 14e and upper and lower inside walls 14c, 14d which are respectively inwardly bent from the right and left sides 11b of the leg shield 11, just under the container portion 13 or the lower end of the upper portion 11c of the front portion 11a of the shield 11; and the upper end of the fender portion 12; as well as by the inner wall 14a which connects the inside walls and further by the lid 16.

Figure 11:
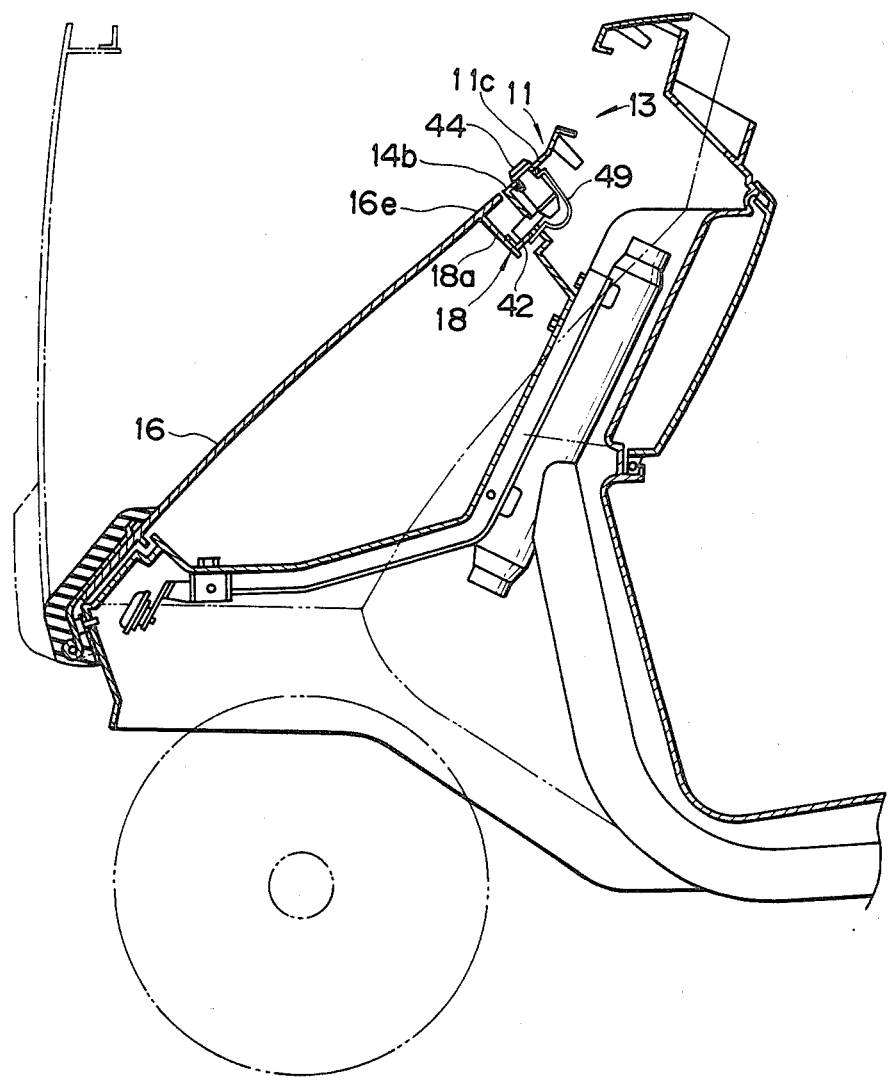
FIG. 11 is a longitudinal sectional view of a principal portion of the vehicle of FIG. 1 taken along a line which passes through a locking mechanism for a trunk compartment lid.

As shown with broken lines in FIGS. 6 and 11, the lid member 16 is adapted to remain in a substantially vertically erect position when open, such that the uppermost portion of said lid member is positioned above the uppermost portion of a headlight unit 68 (see FIG. 15) when the lid member is in the erect position.

Figure 8:
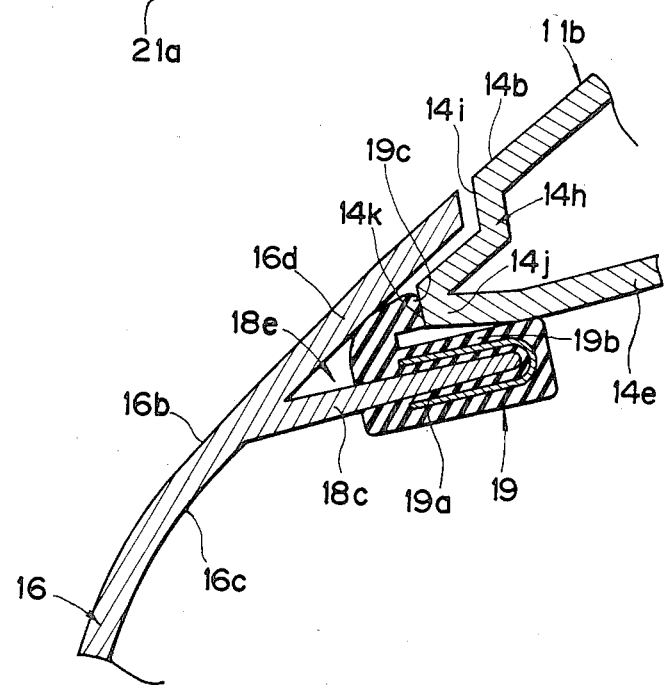
FIG. 8 is an enlarged view of the portion indicated by arrow 8 in FIG. 7.

As shown in FIG. 8, moreover, right and left elongated side portions 14h of the overall peripheral opening edge 14b of the front compartment 14 are provided with stepped portions 14i which extend symmetrically toward the inside of compartment 14. The stepped portions 14i are each provided at an inner end thereof with a projection 14j in the form of a male taper which projects forwardly, with a tip end portion 14k of the projection 14j being flat to form a sealing surface. Further, the projections 14j are longitudinally formed throughout the overall length of the right and left side portions 14h, and the stepped portions 14i are respectively connected to the curved right and left outside surfaces of sides 11b of the leg shield 11. Because the projections 14i are so molded, the rigidity in both the transverse and longitudinal directions is enhanced. On the other hand, the right and left side portions 16b of the lid 16 are bent obliquely rearwardly, and the side portion 18c of the projection 18 extends rearwardly in the inside in the transverse direction of the side portions 16b so as to cover the overall length in the vertical direction. A rearwardly open concave groove 18e in the form of a female taper in transverse section is formed by the spacing between the side portion 18c of the projection 18 and the side portion 16b of the lid 16. The grooves 18e are longitudinally formed symmetrically on both right and left sides and have a width sufficiently larger than the width of the projection 14j. The side portions 18c of the projection 18 are each covered at an end portion thereof with the rubber seal 19 which is substantially U-shaped in transverse section. The rubber seal 19 is provided internally and longitudinally with a substantially U-shaped core 19a and is further integrally provided, at a front end of the side portion 19b thereof on the groove 18e side, with a lip portion 19c which extends outwardly sideways.

The lid 16 is fixed at two lower end portions thereof to the fender portion 12 of the leg shield 11 by means of hinges 17, and can shift to the right and left or deflect at the portion of the hinges 17 due to the mounting error or manufacturing error thereof with respect to the opening edge 14a of compartment 14, etc. However, when the lid 16 is being closed, the outside portion 19b of the flexible rubber seal 19 strikes the inner surface of the tapered projection 14j, so that the lid 16 is guided by the projection 14j, thus allowing an upper portion 16d of the side portion 16b to move toward the stepped portion 14i and the outer surface of the projection 14j. Consequently, the upper portion 16d of the side portion 16b faces the outside surface of the projection 14j, thus allowing the lid 16 to close both side portions of the opening edge 14a of compartment 14. In this state, the side portions 16b of the lid 16 and the side portions 11b of the leg shield 11 become substantially flush with each other at the respective outside surfaces, and thus, in appearance, a single continuous surface is formed.

Moreover, the lip portion 19c of the rubber seal 19 contacts the sealing surface formed at the tip end of the projection 14j to provide an effective seal, whereby the groove 18e and the projection 14j are opposed to each other in a substantially water-tight manner through the rubber seal 19 to prevent water or other foreign matter from entering the interior of compartment 14. Further, by virtue of the flexible elastic action of the rubber seal 19 and the guiding action of the tapered groove 18e and the projection 14j, closing of the lid 16 can be performed smoothly and a tight sealing is attained even when the lid 16 and the opening edge 14a are about to shift in the right and left direction.

Figure 9:
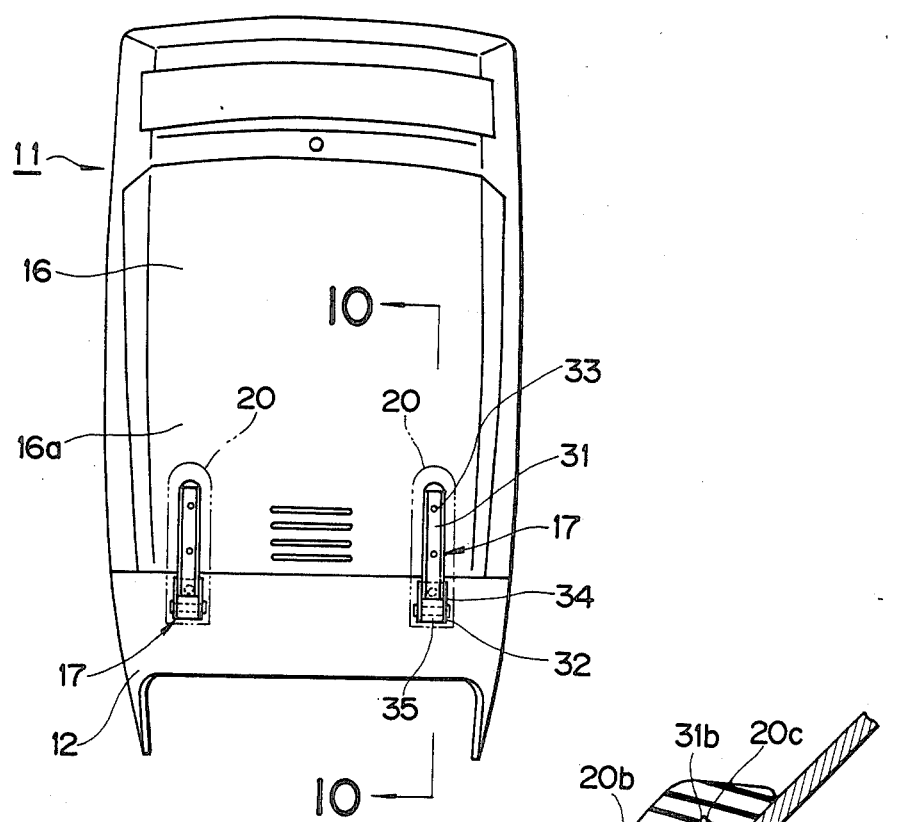
FIG. 9 is a front view of a principal portion of the front cover device of FIG. 5 with a pair of rubber bumpers removed.
Figure 10:
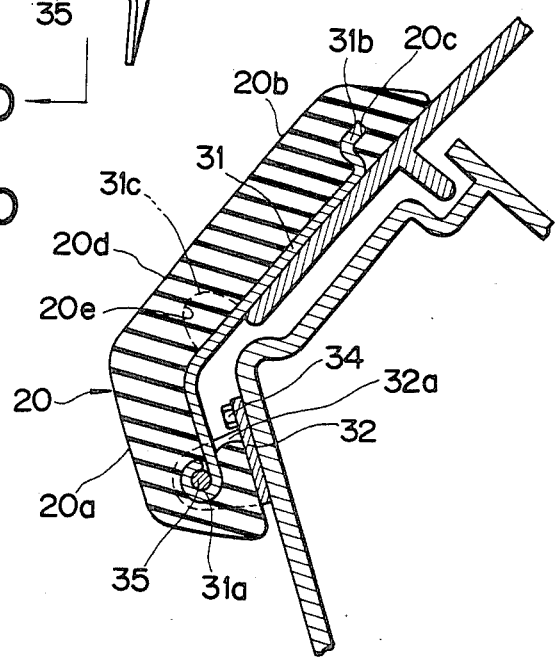
FIG. 10 is an enlarged sectional view taken along line 10—10 of FIG. 9, and including the rubber bumpers.

Referring now to FIGS. 9 and 10, the hinges 17 of the trunk lid 16 each comprise a vertically elongated plate member 31 which are substantially sidewards V-shaped in side elevation and a bifurcated bracket member 32 which pivotably supports the plate member 31. In other words, the plate member 31 has the form of an arch in a side view thereof, in which the center portion projects forwardly. The plate member 31 is fixed with a plurality of machine screws 33 to the lower portion of the upper surface 16a of the lid 16 and is provided at the lower end thereof with a loop portion 31a. On the other hand, the bracket member 32 is fixed with a machine screw 34 to the upper outside surface of the fender 12, and between the right and left projections 32a thereof is inserted the loop portion 31a of the plate member 31, which is pivotably fixed with a pin 35. In this manner, the lower portion of the lid 16 is hingedly engaged with the fender 12 of the leg shield 11. The plate member 31 is provided at the upper end thereof with a bent portion 31b and at the right and left sides of the intermediate bent portion thereof with projections 31c, and an elastic member 20, which is fabricated of rubber in this embodiment, is attached to the plate member 31 so as to cover the outer surface of the latter. The rubber member 20 is vertically elongated and has a large wall thickness, and the lower portion 20a thereof is bent to be substantially L-shaped in side elevation. In other words, in conformity with the forwardly downwardly inclined shape of the lower portion of the lid 16 and the forwardly upwardly inclined shape of the fender 12, the bent lower portion of the rubber member 20 extends to cover the front of the bracket member 32, while the upper portion 20b thereof is formed to entirely cover the outer surface of the plate member 31 i.e., in the shape of an arch having its center portion projecting forwardly. At the rear of the upper portion 20b of the rubber member 20 is formed a notched portion, with which is engaged the bent portion 31b of the plate member 31, while at the rear of an intermediate portion 20d of the rubber member 20 are formed right and left recesses 20e, with which are engaged the projections 31c of the plate member 31. In this manner, the rubber member 20 is fixed to the plate member 31.

It will thus be understood that the right and left rubber members 20 serve as right and left bumpers at the lower front portion of the leg shield while covering the right and left hinges 17.

Although in the foregoing embodiment the large compartment or trunk 14 is provided at the front portion of the vehicle, it may alternatively be provided at the rear portion of the vehicle, in which case rear bumpers can be formed in the same manner as described above. Moreover, the mounting structure of the rubber member 20 is not limited to that exemplified above, and the rubber member 20 may be mounted by any suitable means such as, for example, by fusing.

Figure 12:
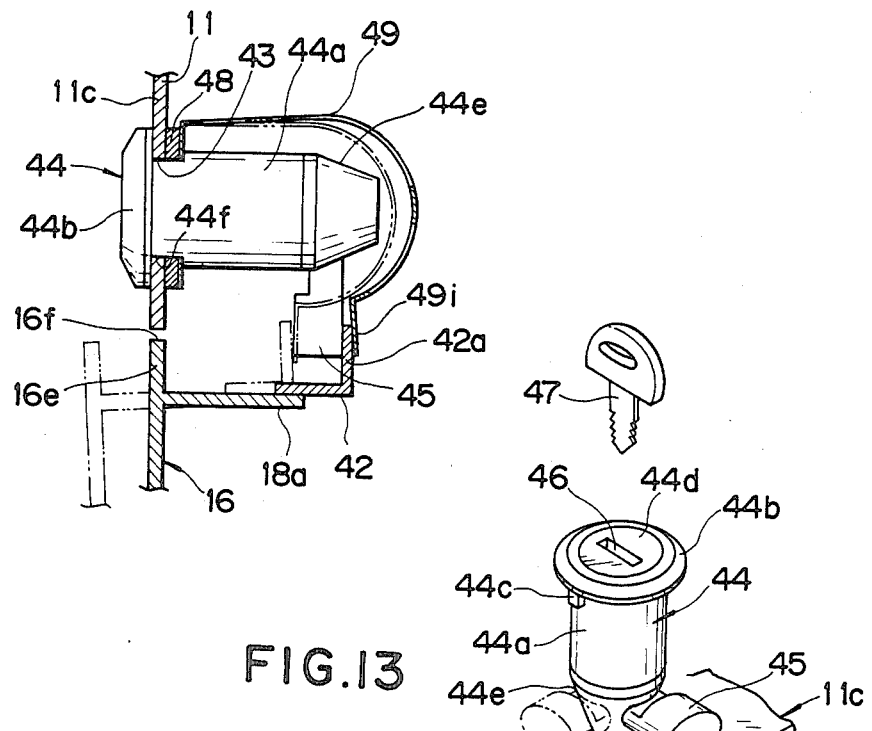
FIG. 12 is an enlarged view of the locking mechanism of FIG. 11.
Figure 13:
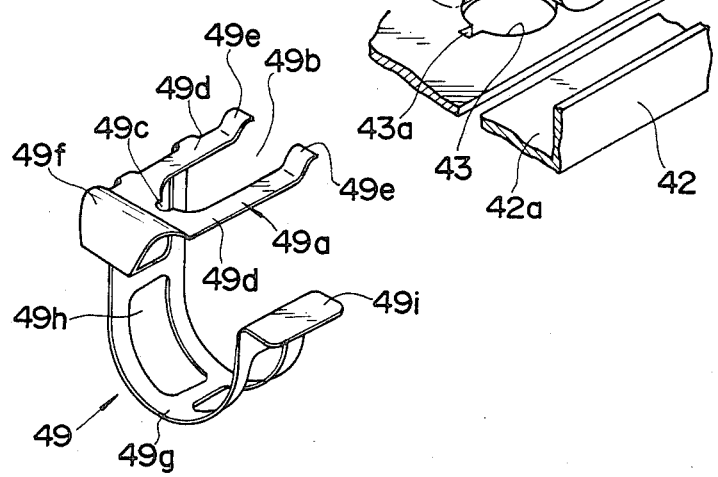
FIG. 13 is an exploded view of the locking mechanism of FIG. 12.

Referring now to FIGS. 11 through 13, the upper portion 18a of the circumferential projection 18 of the lid 16 is provided so as to project downwardly rearwardly by a predetermined length from an upper end portion edge 16e of the lid 16, as shown in FIG. 11, and a top portion 16f of the upper edge portion 16e projects above the upper portion 18a of the projection 18, as shown in FIG. 12. A substantially L-shaped hook member 42 is fixed to the central part in the transverse direction (right and left direction) of the upper portion 18a, i.e., at an upper end of lid 16, and a hook portion 42a of the hook member 42 extends upwardly from a tip portion of the projection 18a. As previously noted, the upper portion 11c of the front portion 11a is disposed just under the container portion 13 of the leg shield 11 which constitutes the upper front of the opening edge 14b of the compartment 14, and substantially centrally in the transverse direction of the upper portion 11c of the front 11a is formed a circular mounting hole 43 which extends through the upper portion 11c. As shown in FIG. 13, a radially extending retaining notch 43a is formed in part of the circumference of the hole 43. Into the hole 43 is inserted a lock member 44, a body 44a of which is cylindrical and is provided at the upper or head portion thereof with a flange portion 44b having a diameter larger than that of the hole 43. The flange portion 44b is provided at part of the lower side thereof with a retaining portion 44c in opposed relation to the notch 43a, and from the lower portion of the body 44a there projects a lock piece extending radially outwardly. In an upper surface 44d of the body 44a disposed above the flange portion 44b is formed a key way 46.

In operation, by inserting a key 47 into the key way 46 and turning the same, a pivot member 44e disposed within the body 44a is pivotably moved to pivot the lock piece 45 at a predetermined angle, e.g., 90°.

For mounting, the body 44a is inserted in the mounting hole 43 until the retaining portion 44c thereof engages the notch 43a to provide a swivel stop, and then a clip 48 is fitted over a constricted portion 44f formed at the upper portion of the body 44a, whereby the upper front 11c of the leg shield 11 is held at the top portion thereof in the vicinity of the mounting hole 43 between the flange portion 44b and the clip 48, and the lock member 44 is held in place.

In the present embodiment, as shown in FIG. 12, the lock member 44 is retained by a spring member 49. The spring member 49, as shown in detail in FIG. 13, includes a bifurcated body 49a, a concavity 49b formed in the body 49a and a notch 49c at the inner end portion of the concavity 49b, the notch 49c being adapted to engage the retaining portion 44c of the lock member 44. The concavity 49b is of the same width as the constricted portion 44f of the lock member body 44a, and a bulged portion 49e is formed at each tip end portion of right and left legs 49d of the concavity 49b, with a bulged portion 49f also being formed integrally at the base portion of the body 49a. The legs 49d are inserted below the clip 48 at the constricted portion 44f to thereby fix the body 49a, i.e., the bulged portions 49e and 49f strike the inner surface of the upper front portion 11c of the leg shield 11 in the vicinity of the mounting hole 43 and are thereby resiliently held in place. From one side of one leg 49d there extends a substantially U-shaped spring portion 49g having a predetermined width. The spring portion 49g is provided in the intermediate portion thereof with a plurality of apertures 49h and at the free end thereof with an abutting piece 49i which is outwardly bent below and beyond the other leg 49d.

When the spring member 49 engages the lock member 44 in the manner described above, the abutting piece 49i abuts the hook portion 42a as indicated by a solid line in FIG. 12; i.e., in the closed state of the lid 16, the hook portion 42a causes the abutting piece 49i to retreat against the spring force.

More particularly, when the key 47 is inserted in the key way 46 and turned in the locking direction, the lock piece 45 is projected to the front of the hook portion 42a and the abutting piece 49i of the spring member 49 presses the hook portion 42a resiliently forwardly into contact with the lock piece 45, whereby the lid 16 and the upper front portion 11c of the leg shield 11 are kept flush with each other at the respective outer surfaces thereof.

For unlocking, the key 47 is inserted in the key way 46 and turned in the unlocking direction, whereby the lock piece 45 is pivotably moved and disengaged from the hook portion 42a, so that the hook portion 42a becomes movable back and forth; however, because the rear thereof is in contact with the abutting piece 49i of the spring member 49, it is urged forwardly by the spring force of the spring member 49. As a result, the lid 16 is pushed to the front and lifts, as indicated by the dashed line in FIG. 12, i.e., the upper end 16f of the lid 16 projects ahead of the opening edge 14b, and therefore the lid can be opened easily by pulling such portion.

Figure 14:
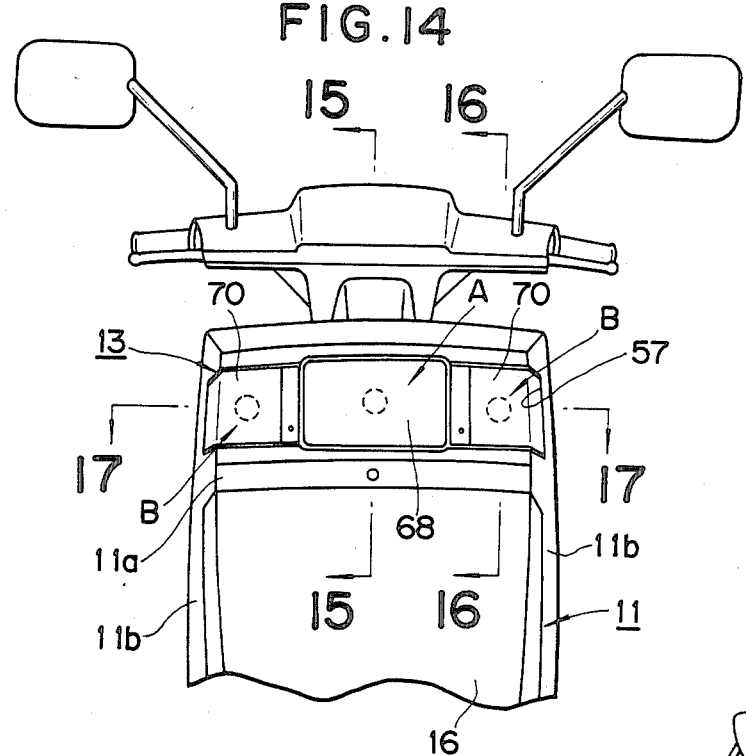
FIG. 14 is an enlarged front view of the upper portion of the small-sized vehicle of FIG. 1.
Figure 15:
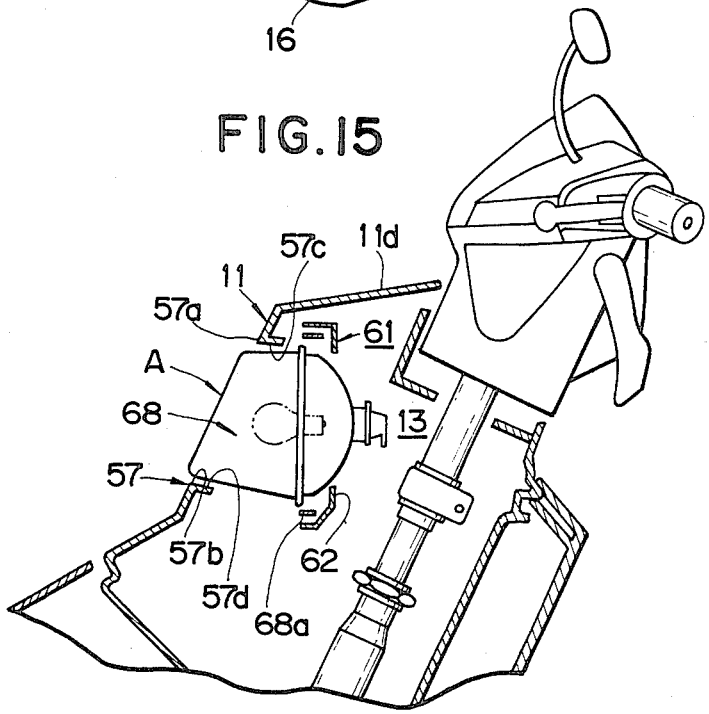
FIG. 15 is a sectional view of a principal portion taken along line 15—15 of FIG. 14.
Figure 16:
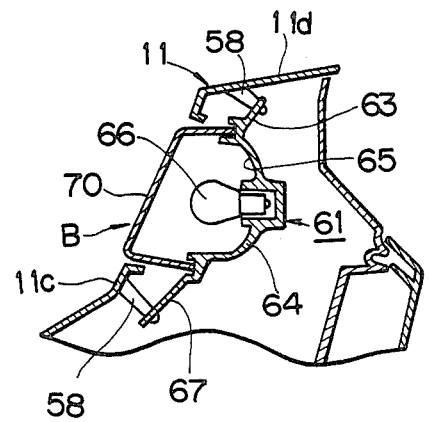
FIG. 16 is a sectional view of a principal portion taken along line 16—16 of FIG. 14.

Referring now to FIGS. 14 through 18, an opening portion 57, which is relatively short in the vertical direction and relatively long in the transverse direction, is formed in the front face of the container portion 13, as shown in FIG. 14. Both sides of the transversely long opening portion 57 extend up to the sides 11b of the leg shield 11. As shown in FIG. 15, inwardly bent upper and lower flanges 57c and 57d are formed on upper and lower sides 57a and 57b of the opening portion 57, and as shown in FIG. 16, a support rod 58 is integrally formed on the inside of each of upper and lower, right and left portions of the opening 57, i.e., right and left of the rear of an upper surface 11d of the leg shield 11 and right and left of the rear of the upper portion 11c of the front portion 11a.

Figure 17:
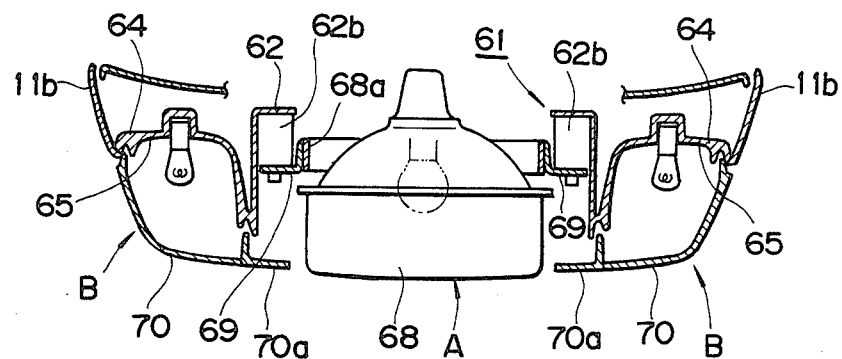
FIG. 17 is a sectional view of a principal portion taken along line 17—17 of FIG. 14.
Figure 18:
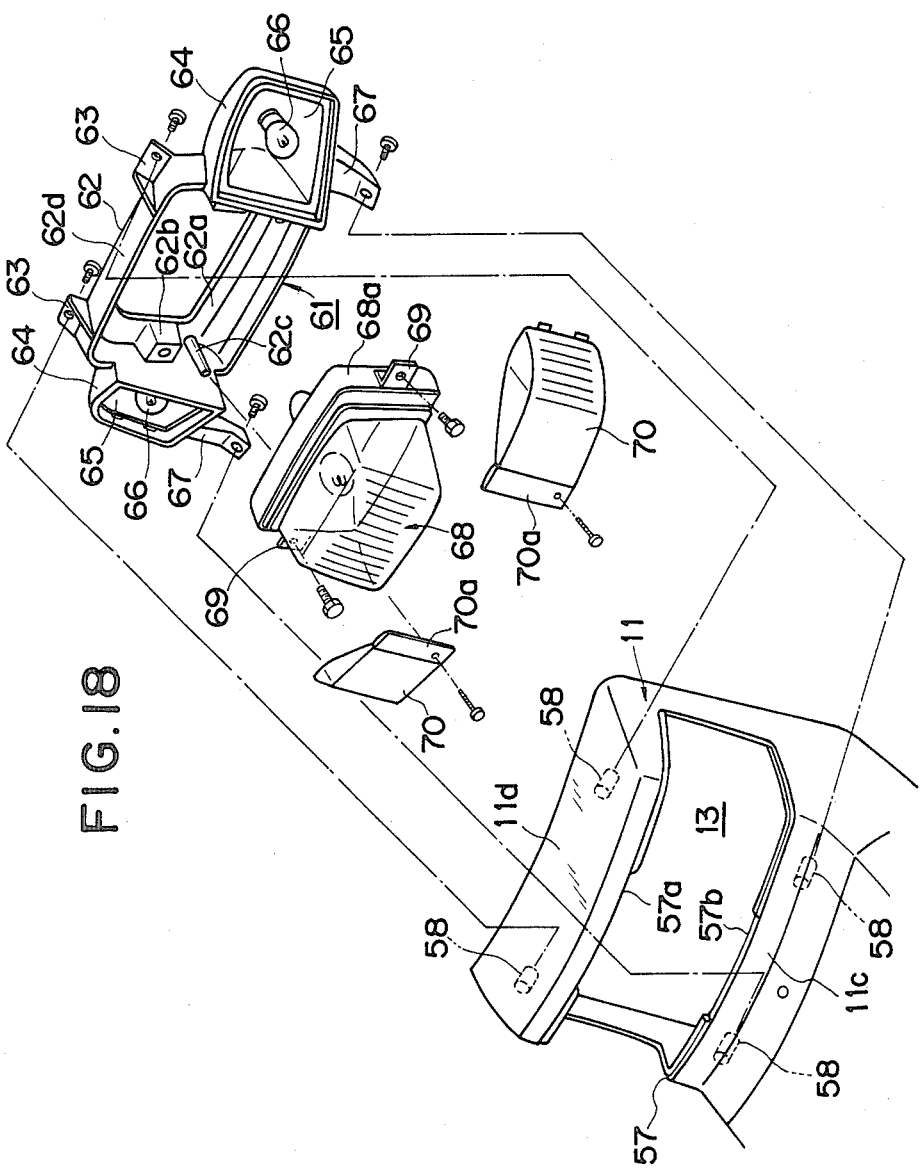
FIG. 18 is an exploded view of a lighting unit accommodating portion in the small-sized vehicle of FIG. 14.

A holding frame 61 forming a further part of the lighting unit according to the invention, as clearly shown in FIGS. 17 and 18, is fitted in the opening portion 57 from the rear of the latter. The holding frame 61, which is transversely elongated, is provided centrally with a headlight holding frame portion 62. On the right and left portions of a bottom frame 62a of the frame portion 62 there are formed relatively short boss portions 62b and relatively long boss portions 62c, and at both right and left upper sides of a peripheral frame 62d there are mounted brackets 63, while at both right and left side portions of the peripheral frame 62d there are formed blinker light holding portions 64. The frame portions 64, which are in the form of rearwardly bulged concavities, are each provided at the front thereof with a reflection surface 65, and a bulb 66 is attached to each of the central portions thereof. Further, downwardly extending brackets 67 are mounted on the lower portions of the frame portions 64.

The holding frame 61 is fitted in the opening portion 57 from the rear of the latter until the brackets 63 and 67 abut corresponding support rods 58, and the brackets are then fixed with machine screws whereby the holding frame 61 is secured to the container portion 13 with the brackets 63 and 67 reinforcing same at the opening portion 57. Thereafter, a frame portion 68a of a headlight unit 68 is inserted from the front into the central frame portion of the holding frame 61, and brackets 69 mounted on both right and left sides of the frame portion 68a are fixed to the boss portions 62b with machine screws, whereby the headlight unit 68 is fixed to the central portion of the holding frame 61. Further, colored blinker light lenses 70 are fitted in the right and left frame portions 64 from the respective fronts to cover the latter. The lenses 70 are held in place by fixing the respective inner mounting pieces 70a thereof to the boss portions 62c with machine screws. In this manner, a headlight A and blinker lights B are attached respectively to the front and to the right and left of the opening 57 of the container portion 13 and are arranged substantially in a single row in the transverse direction, facing outwardly from the opening portion 57.

Although there have been described what are at present considered to be the preferred embodiments of the invention, it will be understood that the invention may be embodied in other specific forms without departing from the spirit or essential characteristics thereof. The present embodiments are therefore to be considered in all respects as illustrative, and not restrictive. The scope of the invention is indicated by the appended claims rather than by the foregoing description.

What is claimed is:

1. In a small-sized vehicle having at least one front wheel, a steering mechanism for steering said front wheel and a steering support which supports said steering mechanism, a front cover device comprising:
    a leg shield member which covers the front and lateral sides of said steering support;
    a first compartment defining a first goods accommodating space within said leg shield member;
    said first accommodating space being disposed on the front side of said steering support;
    said leg shield member including a lid member which forms part of a front portion of said leg shield member and is adapted to open and close from the front of said first accommodating space;
    a headlight is supported on said leg shield and disposed at the upper portion of said leg shield;
    said lid member is adapted to remain in a substantially vertically erect position when open;
    said lid member is pivotably secured at the lower end portion thereof to said front portion through at least one hinge mechanism; and
    said vehicle is provided with at least one bumper, said bumper comprising an elastic member mounted so as to cover said hinge mechanism, whereby said bumper comprises a forwardmost projection of said front cover device.

2. A front cover device according to claim 1, wherein:
    said lid member has right and left sides thereof bent rearwardly, and the edges of said right and left sides of said lid member extend to right and left sides, respectively, of said leg shield member;
    a rearwardly open edge of the right and left sides of said lid member is provided with a concave groove which is at least partially tapered and a peripheral edge of said first compartment is provided with a tapered projection at the portion corresponding to said concave groove, such that said concave groove and said tapered projection cooperate to cause a guiding action for tight sealing therebetween; and
    a flexible seal member is interposed between said concave groove and said tapered projection.

3. A front cover device according to claim 1, wherein:
    said leg shield member is provided with a locking mechanism, said locking mechanism comprising:
    a lock member disposed between said headlight and said first goods accommodating space;
    a lock piece fitted in said lock member so as to be pivotable between predetermined open and closed positions;
    a hook member fixed to said lid member, said hook member being retained by said lock piece in said closed position and disengaged therefrom in said open position; and
    a resilient member fixed at one end thereof to said lock member, the other end of said resilient member normally biasing said hook member in the opening direction;
    said hook member being fixed to an upper end of said lid member.

4. A front cover device according to claim 1, wherein:
    said vehicle is provided with a lighting unit which comprises a headlight and right and left blinker lights;
    said leg shield member includes within the upper portion thereof a container portion defining a space having a transversely elongated opening, said container space accommodating said lighting unit; and
    said headlight and said blinker lights are arranged substantially in a single row in the transverse direction and face outwardly from said transversely elongated opening.

5. A front cover device according to claim 1, wherein:
    said front cover device further comprises a second compartment provided behind said steering support, said second compartment defining a second accommodating space which surrounds, from behind and either side, said steering support, and is openable to the rear; and
    said first and second accommodating spaces are defined substantially around the overall periphery of said steering support, while being separated from each other in the front and rear of said steering support, respectively.

6. A front cover device according to claim 5, wherein:
    said vehicle comprises a low floor type three-wheeled motor vehicle;
    said steering mechanism comprises a front fork member which supports said front wheel; and
    said leg shield member has a front fender provided at the lower portion thereof, said front fender covering the upper portion of said front wheel.

7. A front cover device according to claim 1, wherein:
    said lid member has a substantially large flat surface.

8. In a small-sized vehicle according to claim 1, wherein:
    said vehicle further having one front wheel and a front fender provided at the lower end of said leg shield and covering over said front wheel; and said bumper is mounted so as to extend over the lower end of said lid member and the upper end of said front fender.

9. A front cover device according to claim 1, wherein:

the upper end of said lid member is positioned a substantial distance above the lower end of said headlight when said lid member is in said erect position.

10. A front cover device according to claim 1, wherein:

said hinge mechanism has a form of an arch so that, in a side view thereof, a center portion projects forwardly.

* * * * *

UNITED STATES PATENT AND TRADEMARK OFFICE
CERTIFICATE OF CORRECTION

PATENT NO. : 4,697,842
DATED : October 6, 1987
INVENTOR(S) : Katsuyoshi KAWASAKI It is certified that error appears in the above-identified patent and that said Letters Patent is hereby corrected as shown below:

```
Column 3, line 54, change "reflector" to --reflection--.
Column 4, line 22, change "bding" to --being--.
First page, [30] Foreign Application Priority Data, change
"Sep. 11, 1981 [JP] Japan..........56-135078[U]" to
--Sep. 11, 1981 [JP] Japan..........56-135076[U]--.
```

Signed and Sealed this

Twelfth Day of April, 1988

Attest:

DONALD J. QUIGG

*Attesting Officer*   *Commissioner of Patents and Trademarks*